United States Patent
Singh et al.

(10) Patent No.: US 10,142,918 B2
(45) Date of Patent: Nov. 27, 2018

(54) DATA COMMUNICATION NETWORK TO PROVIDE HOP COUNT DATA FOR USER EQUIPMENT SELECTION OF A WIRELESS RELAY

(71) Applicant: Sprint Communications Company L.P., Overland Park, KS (US)

(72) Inventors: Jasinder Pal Singh, Olathe, KS (US); Deveshkumar Narendrapratap Rai, Overland Park, KS (US); Naresh Madineni, Overland Park, KS (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 100 days.

(21) Appl. No.: 15/247,332

(22) Filed: Aug. 25, 2016

(65) Prior Publication Data
US 2018/0063771 A1    Mar. 1, 2018

(51) Int. Cl.
| | |
|---|---|
| *H04W 48/10* | (2009.01) |
| *H04B 7/155* | (2006.01) |
| *H04L 12/733* | (2013.01) |
| *H04W 48/12* | (2009.01) |

(Continued)

(52) U.S. Cl.
CPC ........ *H04W 48/10* (2013.01); *H04B 7/15507* (2013.01); *H04L 45/20* (2013.01); *H04W 48/12* (2013.01); *H04W 84/047* (2013.01); *H04W 88/04* (2013.01)

(58) Field of Classification Search
CPC ... H04W 48/10; H04W 48/12; H04W 84/047; H04W 88/04; H04B 7/15507; H04L 45/20
See application file for complete search history.

(56) References Cited

U.S. PATENT DOCUMENTS

| | | | |
|---|---|---|---|
| 2013/0215872 A1* | 8/2013 | Johansson ............ | H04B 7/0404 370/335 |
| 2014/0198708 A1* | 7/2014 | Lee ........................ | H04W 76/14 370/312 |

(Continued)

FOREIGN PATENT DOCUMENTS

| | | |
|---|---|---|
| EP | 1826951 | 8/2007 |
| WO | 2014112834 | 7/2014 |

(Continued)

OTHER PUBLICATIONS

"Addition of establishment cause for mobile-originating VoLTE calls and network indication in SIB2;" 3GPP TSG-RAN WG2 Meeting #92; Nov. 16, 2015; 8 pages; Version 12.7.0; Nokia Networks; Anaheim, U.S.A.

*Primary Examiner* — Habte Mered

(57) ABSTRACT

A data communication network to provide hop count data for User Equipment (UE) selection of a wireless relay. The data communication network comprises a macro base station and a plurality of wireless relays that serve UEs. The wireless relays receive a hop count, and in response, increment their individual hop count and wirelessly broadcast individual relay Long Term Evolution (LTE) System Information Blocks (SIBs) indicating their individual hop counts. The wireless relays receive wireless UE attachments responsive to the relay LTE SIB broadcasts of their individual hop counts.

18 Claims, 7 Drawing Sheets

(51) Int. Cl.
    *H04W 84/04*      (2009.01)
    *H04W 88/04*      (2009.01)

(56) References Cited

U.S. PATENT DOCUMENTS

| | | | |
|---|---|---|---|
| 2015/0230092 A1* | 8/2015 | Ueki | H04W 76/10 |
| | | | 455/411 |
| 2015/0257024 A1 | 9/2015 | Baid et al. | |
| 2016/0014664 A1* | 1/2016 | Singh | H04W 36/14 |
| | | | 370/332 |
| 2016/0174188 A1* | 6/2016 | Kim | H04W 68/02 |
| | | | 455/458 |
| 2016/0192439 A1* | 6/2016 | Phuyal | H04W 88/04 |
| | | | 370/315 |
| 2017/0302181 A1* | 10/2017 | Shimizu | H02M 3/158 |
| 2017/0313181 A1* | 11/2017 | Isono | B60K 1/02 |
| 2017/0353849 A1* | 12/2017 | Lim | H04W 8/02 |

FOREIGN PATENT DOCUMENTS

| | | |
|---|---|---|
| WO | 2015071705 | 5/2015 |
| WO | 2015109961 | 7/2015 |

\* cited by examiner

US 10,142,918 B2

DATA COMMUNICATION NETWORK TO PROVIDE HOP COUNT DATA FOR USER EQUIPMENT SELECTION OF A WIRELESS RELAY

TECHNICAL BACKGROUND

Wireless communication networks exchange user data between communication devices to facilitate various data services, like Internet access, voice calling, video calling, audio streaming, media streaming, gaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with wireless base stations or another network gateway. In LTE networks, femto-cell relays and pico-cell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol. Wireless relays may be connected to other wireless relays in a daisy chain configuration.

Wireless relays and other wireless access points broadcast System Information Blocks (SIBs) that include network information. For instance, the SIB-9 includes information related to a wireless relay's Home eNodeB. UEs can use the network information broadcasted in the SIBs to attach to a wireless access point/communication network.

Overview

Examples disclosed herein provide a system, method, hardware, and software to provide hop count data for User Equipment (UE) selection of a wireless relay. A data communication network comprises at least one macro base station and a plurality of wireless relays that serve UEs. The wireless relays receive a hop count, and in response increment their individual hop counts and wirelessly broadcast relay Long Term Evolution (LTE) System Information Blocks (SIBs) indicating their individual hop counts. The wireless relays receive wireless UE attachments responsive to the relay LTE SIB broadcasts of their individual hop counts.

In another example, a data communication network provides hop count data for UE selection of a wireless relay. The data communication network comprises a macro base station and wireless relays that serve UEs. The wireless relays receive a hop count, and in response, increment their individual hop counts and wirelessly broadcast relay LTE SIBs indicating their individual hop counts. The wireless relays receive wireless UE attachments responsive to the relay LTE SIB broadcasts of their individual hop counts.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention, and that the features described below can be combined in various ways to form multiple variations of the invention. As a result, the invention is not limited to the specific examples described below, but only by the claims and their equivalents.

Figure 1:
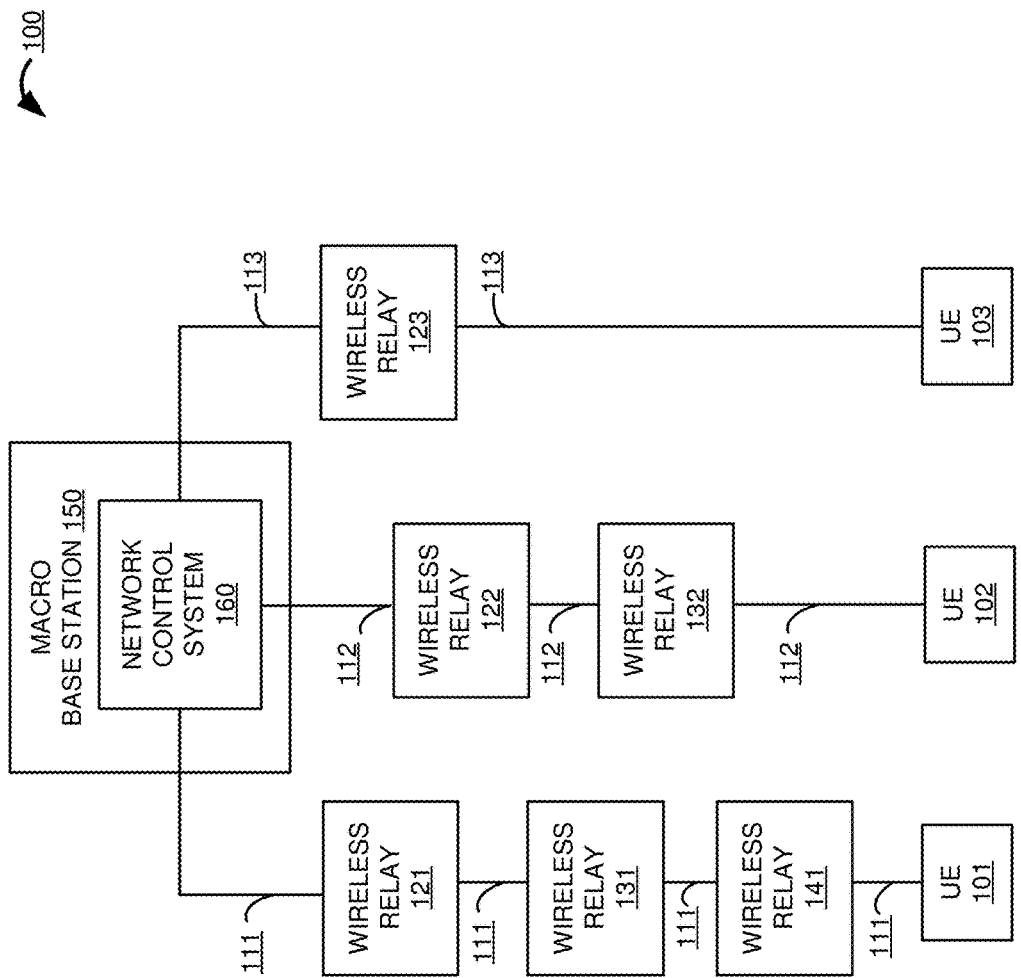
FIG. 1 illustrates a data communication network to provide hop count data for User Equipment (UE) selection of a wireless relay.

FIG. 1 illustrates data communication network 100 to provide hop count data for User Equipment (UE) selection of a wireless relay. Data communication network 100 includes macro base station 150, wireless relays 121-123, 131-132, and 141, UEs 101-103, and communication links 111-113. Macro base station 150 includes network control system 160. In this example, network control system 160 is included as part of macro base station 150, although alternate configurations are possible. Communication link 111 connects macro base station 150, wireless relay 121, wireless relay 131, wireless relay 141, and UE 101. Communication link 112 connects macro base station 150, wireless relay 122, wireless relay 132, and UE 102. Communication link connects macro base station 150, wireless relay 123, and UE 103.

Communication links 111-113 may use any of a variety of communication media, such as air, metal, optical fiber, or any other signal propagation path, including combinations thereof. Also, communication links 111-113 may use any of a variety of communication protocols, such as Internet, telephony, optical networking, wireless communication, Wireless Fidelity (WIFI), Long Term Evolution (LTE), or any other communication protocols and formats, including combinations thereof. Communication links 111-113 could be a direct link or may include intermediate networks, systems, or devices. Communication links 111-113 are representative and may vary.

In some examples, macro base station 150 may comprise an eNodeB. Although not required, wireless relays 121-123, 131-132, and 141 may comprise femto-cell and pico-cell base stations. Examples of UEs 101-103 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, wireless relays 121-123, 131-132, and 141 receive hop count data, and in response, increment their individual hop count. Wireless relays 121-123, 131-132, and 141 wirelessly broadcast relay LTE System Information Blocks (SIBs) indicating their individual hop counts. In some examples, wireless relays 121-123, 131-132, and 141 broadcast their individual hop counts in the SIB-9.

Wireless relays 121-123, 131-132, and 141 receive wireless UE attachments responsive to the relay LTE SIB broadcasts of their individual hop counts. In some examples, the LTE SIBs also include wireless relay capabilities data (e.g. gaming, video streaming, audio streaming, voice calling, video calling, Beam Forming (BF), Carrier Aggregation (CA), Voice over LTE (VoLTE), Device-to-Device (D2D), Video over LTE (ViLTE)), transmission power, average SNR, average RF signal quality, average latency, number of simultaneous users, location, SNR, load, and/or other network data—including combinations thereof.

Wireless relays 121-123, 131-132, and 141 increment their individual relay hop count data before broadcasting to the next wireless relay in the chain. For example, macro base station 150 may have a relay hop count of zero, representing zero hops to the macro base station. Macro base station 150 broadcasts to wireless relays 121-123. Wireless relays 121-123, each increment their individual relay hop count data before broadcasting to subsequent wireless relays in their daisy chain configuration. Therefore, wireless relays 121-123 broadcast a hop count of one; wireless relays 131-132 broadcast a hop count of two; and wireless relay 141 broadcasts a hop count of three.

Wireless relays 121-123, 131-132, and 141 receive wireless UE attachments from UEs 101-103, responsive to the relay LTE SIB broadcasts of their individual hop counts. In one example, UE 101 may be requesting a VoLTE session, which is sensitive to latency, therefore a wireless relay with a relay hop count of one or lower may be selected. In another example, UEs and/or applications running on the UEs may have relay hop count thresholds. For instance, a UE may select a wireless relay based on the relay hop count threshold associated with the requested service.

In another example, UE 101 may request a video streaming service and select wireless relay 141 based on media service name information in the SIB-9 of wireless relay 141 that indicates that wireless relay 141 is capable of providing video streaming service. In other examples, a populated SIB-9 indicates the wireless access point is a wireless relay and a UE or other device requesting service should avoid attaching to wireless access points with populated SIB-9.

Figure 2:
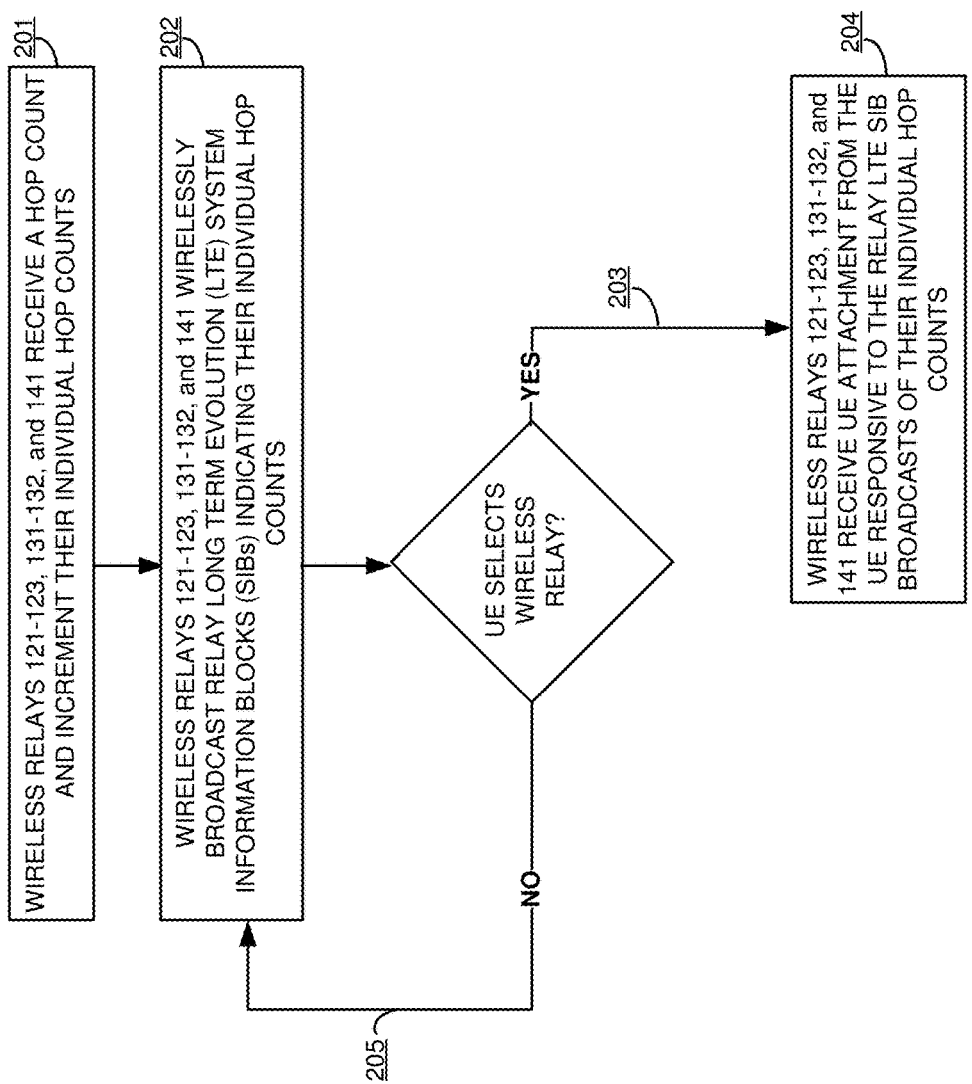
FIG. 2 illustrates the operation of the data communication network to provide hop count data for UE selection of a wireless relay.

FIG. 2 illustrates the operation of data communication network 100 to provide hop count data for UEs 101-103 selection of wireless relays 121-123, 131-132, and 141. Wireless relays 121-123, 131-132, and 141 receive a hop count and increment their individual hop counts (201). In some examples, wireless relays 121-123, 131-132, and 141 will determine their individual hop count upon power up, such as when a wireless relay is first installed. Although not required, wireless relays 121-123, 131-132, and 141 may periodically determine and/or update their individual hop counts. Wireless relays 121-123, 131-132, and 141 may receive and transfer hop count data over a LTE-WIFI link Aggregation (LWA) connection or a LTE Robust Header Compression (RoHC) connection.

Wireless relays 121-123, 131-132, and 141 wirelessly broadcast relay LTE SIBs indicating their individual hop counts (202). If UEs 101-103 select a wireless relay from wireless relays 121-123, 131-132, and 141 (203), then the selected wireless relay receives a wireless UE attachment from the UE, responsive to the relay LTE SIB broadcasts of their individual hop counts (204). If UEs 101-103 do not select a wireless relay from wireless relays 121-123, 131-132, and 141 (205), then UEs 101-103 may continue to monitor LTE SIBs to select a wireless relay or macro base station.

Figure 3:
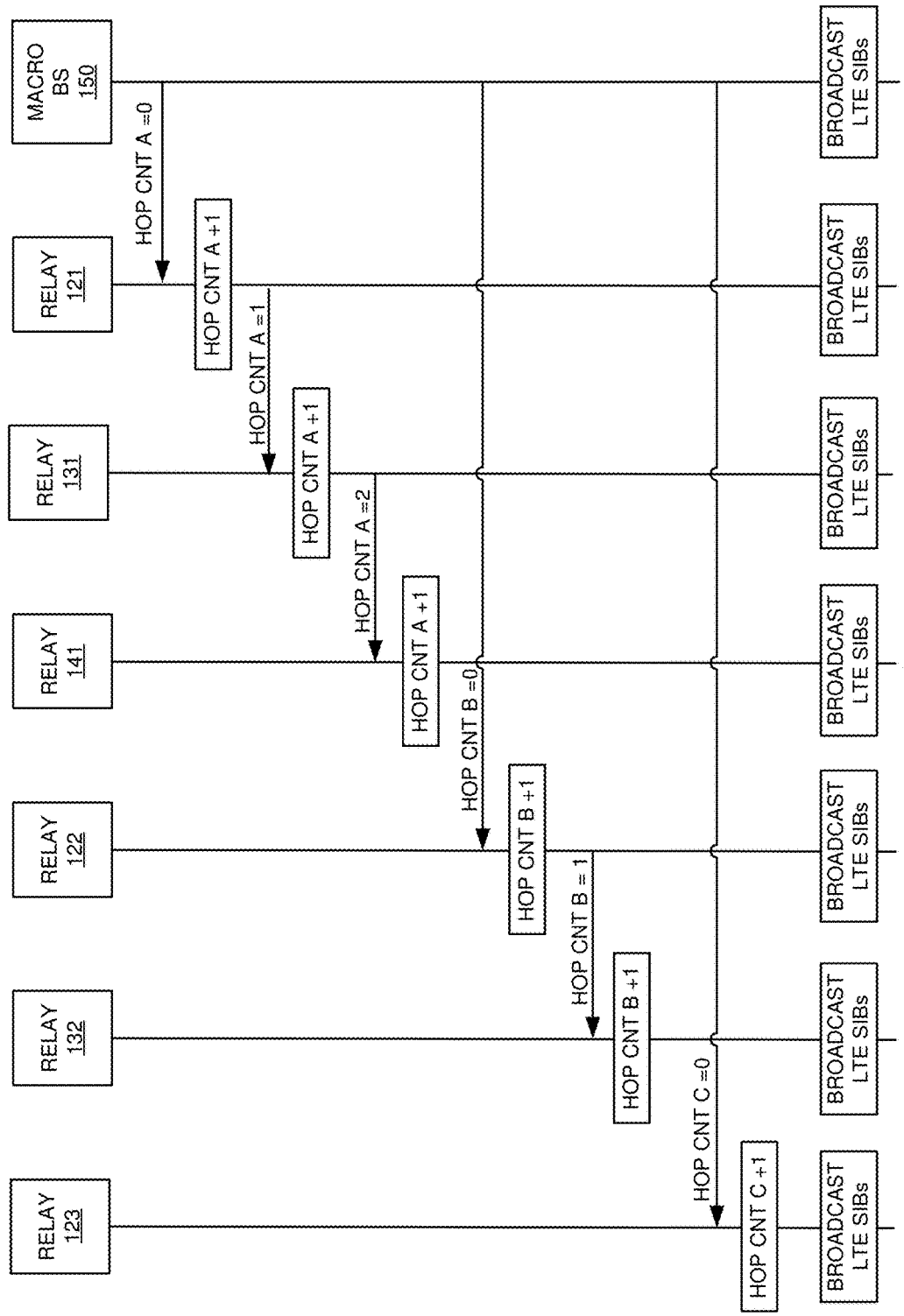
FIG. 3 illustrates the operation of the data communication network to provide hop count data for UE selection of a wireless relay.

FIG. 3 illustrates the operation of data communication network 100 to provide hop count data for UE selection of wireless relays 121-123, 131-132, and 141. Data communication network 100 comprises wireless relays 121-123, 131-132, and 141 that serve UEs 101-103. Macro base station 150 transfers a hop count to wireless relay 121 (i.e. hop count A). Wireless relay 121 receives hop count A=0, wireless relay 121 increments hop count A to one and broadcasts a hop count of one in its LTE SIBs. Wireless relay 121 transfers hop count A to connected wireless relay 131. Wireless relay 131 receives hop count A=1. increments hop count A to two and broadcasts a hop count of two in its LTE SIBs. Wireless relay 131 transfers hop count A to connected wireless relay 141. Wireless relay 141 receives hop count A=2. increments hop count A to three and broadcasts a hop count of three in its LTE SIBs.

Macro base station 150 transfers a hop count to wireless relay 122 (i.e. hop count B). Wireless relay 122 receives hop count B=0, wireless relay 122 increments hop count B to one and broadcasts a hop count of one in its LTE SIBs. Wireless relay 122 transfers hop count B to connected wireless relay 132. Wireless relay 132 receives hop count B=1. increments hop count B to two and broadcasts a hop count of two in its LTE SIBs. Macro base station 150 transfers a hop count to wireless relay 123 (i.e. hop count C). Wireless relay 122 receives hop count C=0, wireless relay 123 increments hop count C to one and broadcasts a hop count of one in its LTE SIBs.

Figure 4:
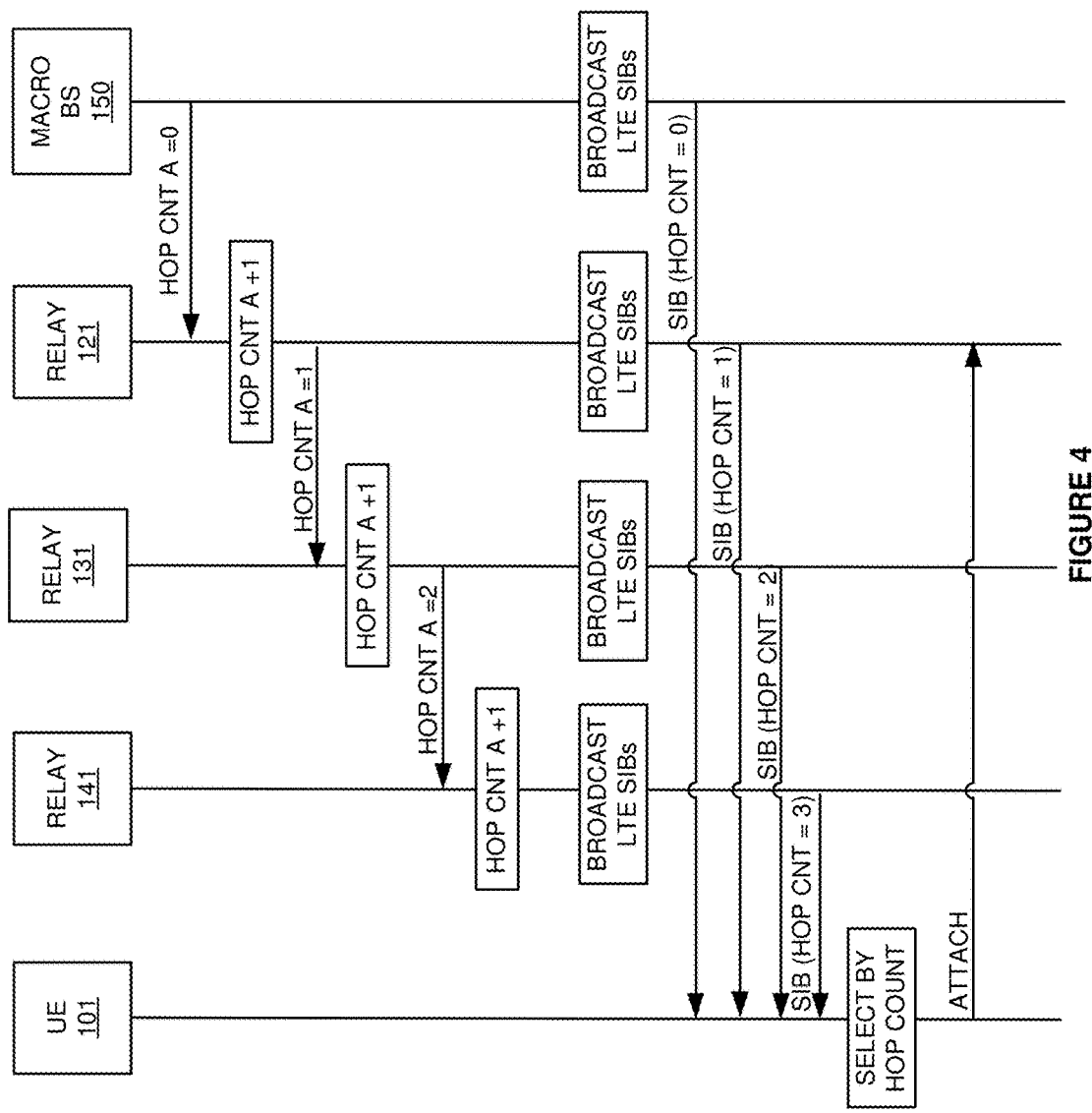
FIG. 4 illustrates the operation of a data communication network to provide hop count data for UE selection of a wireless relay.

FIG. 4 illustrates the operation of data communication network to provide hop count data for UE selection of a wireless relay. Macro base station 150 transfers a hop count to wireless relay 121 (i.e. hop count A). Wireless relay 121 receives hop count A=0, wireless relay 121 increments hop count A to one and broadcasts a hop count of one in its LTE SIBs. Wireless relay 121 transfers hop count A to connected wireless relay 131. Wireless relay 131 receives hop count A=1. increments hop count A to two and broadcasts a hop count of two in its LTE SIBs. Wireless relay 131 transfers hop count A to connected wireless relay 141. Wireless relay 141 receives hop count A=2. increments hop count A to three and broadcasts a hop count of three in its LTE SIBs. Although not required, a wireless relay may have hop count data for other connected wireless relays. For example, wireless relay 121 may also have hop count data for wireless relays 131 and 141; wireless relay 131 may also have hop count data for wireless relay 141; and wireless relay 141 only has its own hop count data. UE selects a wireless relay based on the hop count data in the broadcasted LTE SIBs and sends an attach request to selected wireless relay 121.

Although not required, UE 101 may comprise a hotspot device (i.e. a device that offers a wireless communication connection to other devices). UE 101 receives network access data from the broadcasted LTE SIBs and detects that wireless relay 141 comprise a femto-cell base stations, wireless relay 131 comprises a pico-cell base station, and wireless relay 121 comprises an eNodeB. UE 101 selects wireless relay 121 to avoid connecting to a femto-cell or pico-cell base station.

In some examples, a source wireless relay may use the hop count data to select a target wireless relay for handoff. For instance, the source wireless relay may select a wireless relay with weaker RF signal but a lower relay hop count compared to another wireless relay with a stronger RF signal and a higher relay hop count.

Figure 5:
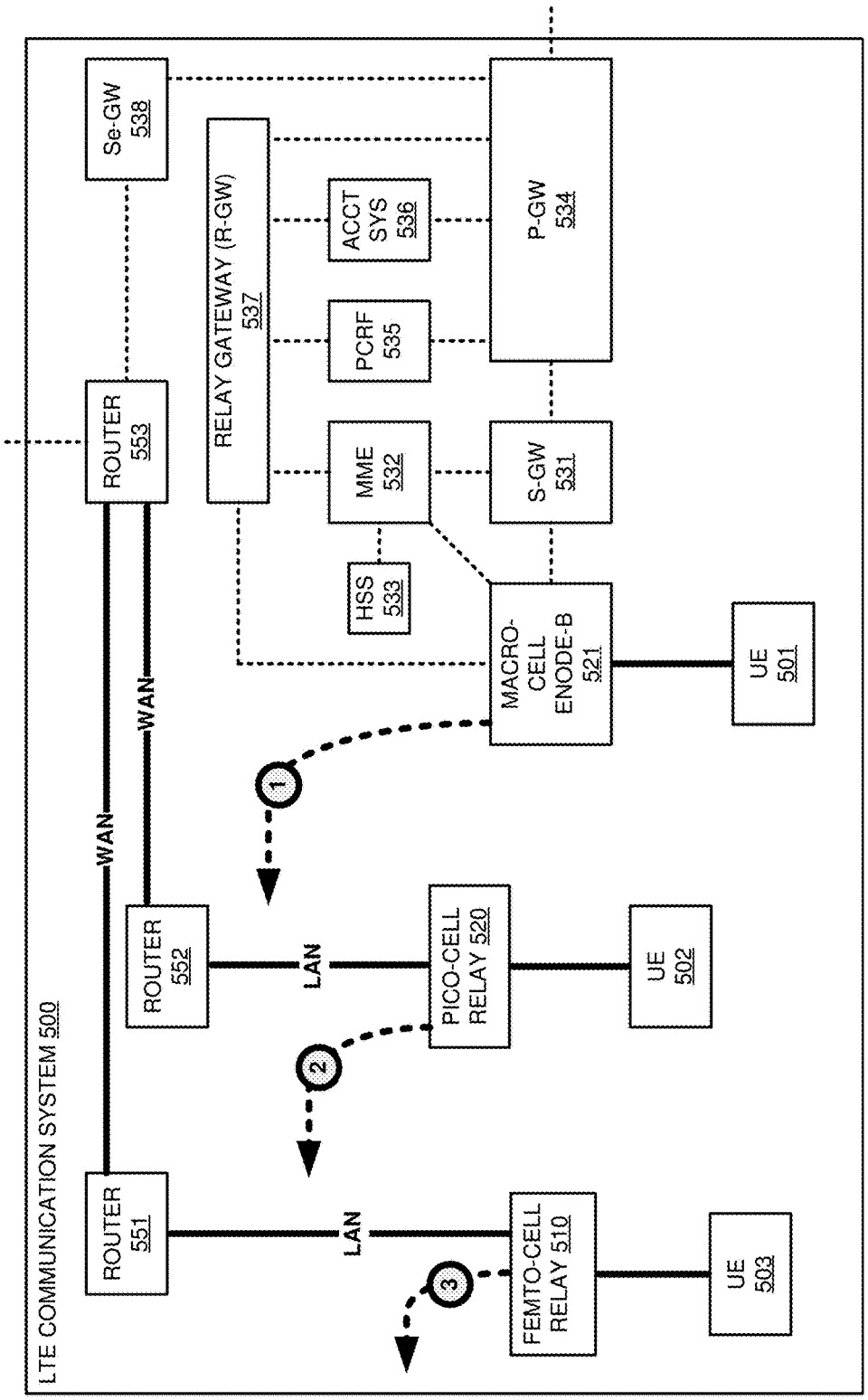
FIG. 5 illustrates a Long Term Evolution (LTE) data communication network to provide hop count data for UE selection of a wireless relay.

FIG. 5 illustrates LTE communication system 500 to provide hop count data for UE selection of a wireless relay. LTE communication system 500 comprises: UEs 501-503, femto-cell relay 510, pico-cell relay 520, macrocell eNodeB 521, Serving Gateway (S-GW) 531, Mobility Management Entity (MME) 532, Home Subscriber System (HSS) 533, Packet Data Network Gateway (P-GW) 534, Policy and Charging Rules Function (PCRF) 535, Accounting system (ACCT) 536, R-GW 537, Security Gateway (Se-GW) 538, and routers 551-553.

Femto-cell relay 510 is coupled to router 551 over a Local Area Network (LAN) such as an Ethernet LAN. Router 551 is coupled to router 553 over a Wide Area Network (WAN) such as a Data Over Cable Service Information Specification (DOCSIS) system, Time Division Multiplex (TDM), Wave Division Multiplexing (WDM), Ethernet, or some other data network. Pico-cell relay 520 is coupled to router 552 over a LAN. Router 552 is coupled to router 553 over a WAN. Router 553 is coupled to Se-GW 538. The number and configuration of routers illustrated is representative and may vary.

To attract UEs, femto-cell relay 510, pico-cell relay 520, and macro-cell eNodeB 521 broadcast hop count data in their LTE SIBs. In addition, femto-cell relay 510, pico-cell relay 520, and macro-cell eNodeB 521 may broadcast multiple PLMN IDs based on their individual service capabilities.

Referring to the circled number one on FIG. 5, macro-cell eNodeB 521 broadcasts a PLMN ID of MACRO RELAY to attract wireless relays like femto-cell relay 510 and pico-cell relay 520. Macro-cell eNodeB 521 may also broadcast PLMN IDs for MACRO UE DATA and MACRO UE VOLTE to attract UEs like UE 501. Likewise, pico-cell relay 520 broadcasts PLMN IDs for PICO UE DATA, PICO UE VOLTE, and PICO RELAY. Femto-cell relay 510 broadcasts PLMN IDs for FEMTO UE DATA and FEMTO UE VOLTE. A PLMN ID is typically associated with one or more Access Point Names (APNs) that are selected by MME 532 and HSS 533 when a UE attaches using that PLMN ID.

To attract UEs using WIFI, femto-cell relay 510, pico-cell relay 520, and macro-cell eNodeB 521 may also broadcast various WIFI Service Set Identifiers (SSIDs). For example, a pico-cell SSID might be as simple as "PICO 420" or be more complex like "PICO 420 RELAY," "PICO 420 UE DATA," or "PICO 420 UE VOLTE."

The relays may exchange wireless data communications using LTE/WIFI Aggregation (LWA). With LWA, the relays may communicate over unlicensed spectrum at 2.4 GHz, 5 GHz, or some other band. In addition, the relay may communicate over licensed spectrum between 0.3 GHz-3 GHz or some other band. Thus, the relays may communicate using LTE or WIFI over licensed or unlicensed spectrum.

Figure 6:
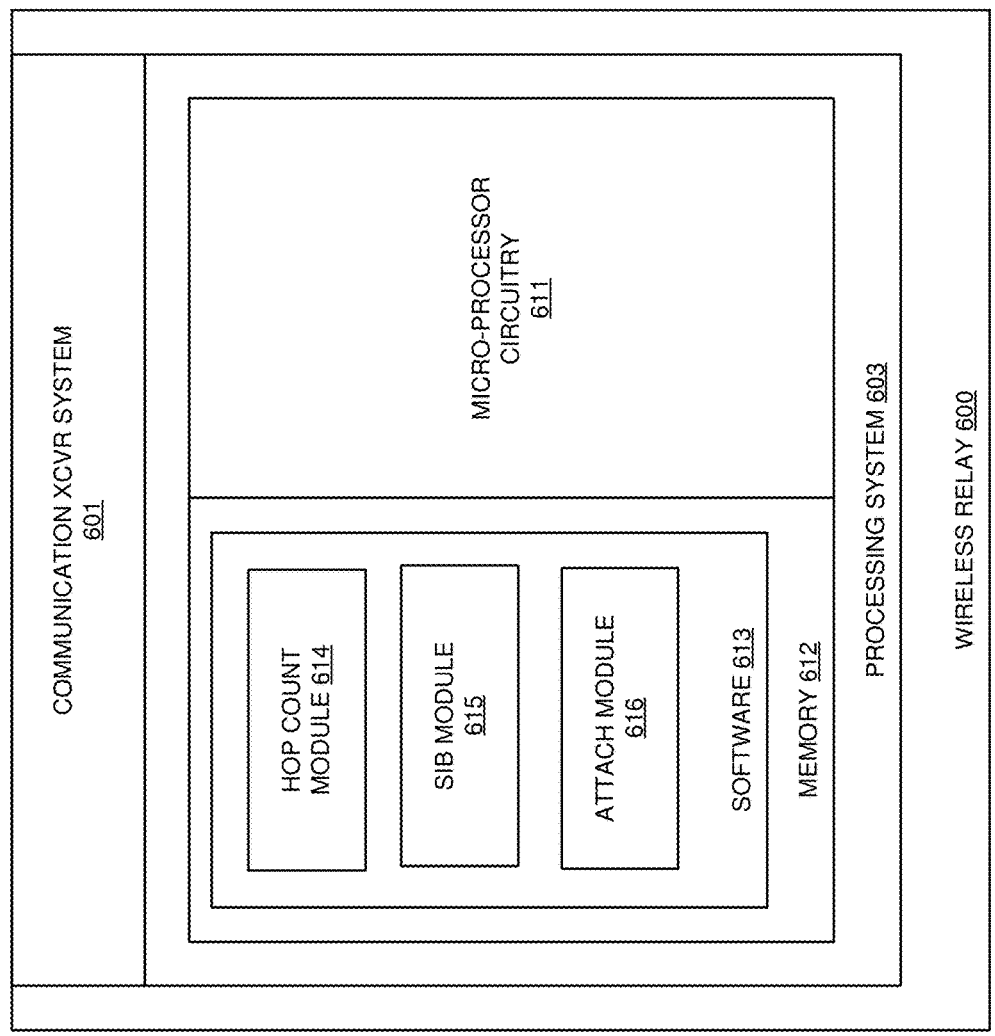
FIG. 6 illustrates an example of a wireless relay.

FIG. 6 illustrates wireless relay 600. Wireless relay 600 is an example of wireless relays 121-123, 131-132, and 141, femto-cell relay 510, pico-cell relay 520, and macro-cell eNodeB 521. Although these systems may use alternative configurations and operations. Wireless relay 600 comprises communication transceiver system 601 and processing system 603. Processing system 603 includes micro-processor circuitry 611 and memory 612 that stores software 613. Software 613 comprises software modules 614-616.

Communication transceiver system 601 comprises components that communicate over communication links such as network cards, ports, RF transceivers, processing circuitry and software, or some other communication components. Communication transceiver system 601 may be configured to communicate over metallic, wireless, or optical links. Communication transceiver system 601 may be configured to use TDM, IP, Ethernet, optical networking, wireless protocols, communication signaling, or some other communication format—including combinations thereof. Communication transceiver system 601 may receive and transfer registration requests. Communication transceiver system 601 may also be configured to communicate using wireless communication protocols such as LTE.

Processor circuitry 611 comprises microprocessor and other circuitry that retrieves and executes operating software 613 from memory 612. Processor circuitry 611 may comprise a single device or could be distributed across multiple devices—including devices in different geographic areas. Processor circuitry 611 may be embedded in various types of equipment. Examples of processor circuitry 611 include central processing units, application-specific processors, logic devices, and/or any type of computer processing devices—including combinations thereof.

Memory 612 comprises a non-transitory computer readable storage medium readable by processing system 603 and capable of storing software 613, such as a disk drive, flash drive, data storage circuitry, or some other hardware memory apparatus—including combinations thereof. Memory 612 can include volatile and non-volatile, removable and non-removable media implemented in any method or technology for storage of information, such as computer readable instructions, data structures, program modules, or other data—including combinations thereof. Memory 612 may comprise a single device or could be distributed across multiple devices—including devices in different geographic areas. Memory 612 may be embedded in various types of equipment. In some examples, a computer apparatus could comprise memory 612 and software 613.

Software 613 comprises computer programs, firmware, or some other form of machine-readable processing instructions. Software 613 may include an operating system, utilities, drivers, network interfaces, applications, or some other type of software. In this example, software 613 comprises hop count module 614, SIB module 615, and attach module 616. Although software 613 could have alternative configurations in other examples.

Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603.

When executed, software 613 directs processing system 603 to operate as described herein to provide hop count data for UE selection of a wireless relay. In particular, hop count module 614 directs processing system 603 to wirelessly broadcast LTE SIBs indicating individual hop counts. SIB module 615 directs processing system 603 to wirelessly broadcast LTE SIBs indicating other network data such as RF data, Carrier Aggregation data, VoLTE data, service capabilities, Beam Forming data, and/or network data—including combinations thereof. Attach module 616 directs processing system 603 to receive UE attachments.

Figure 7:
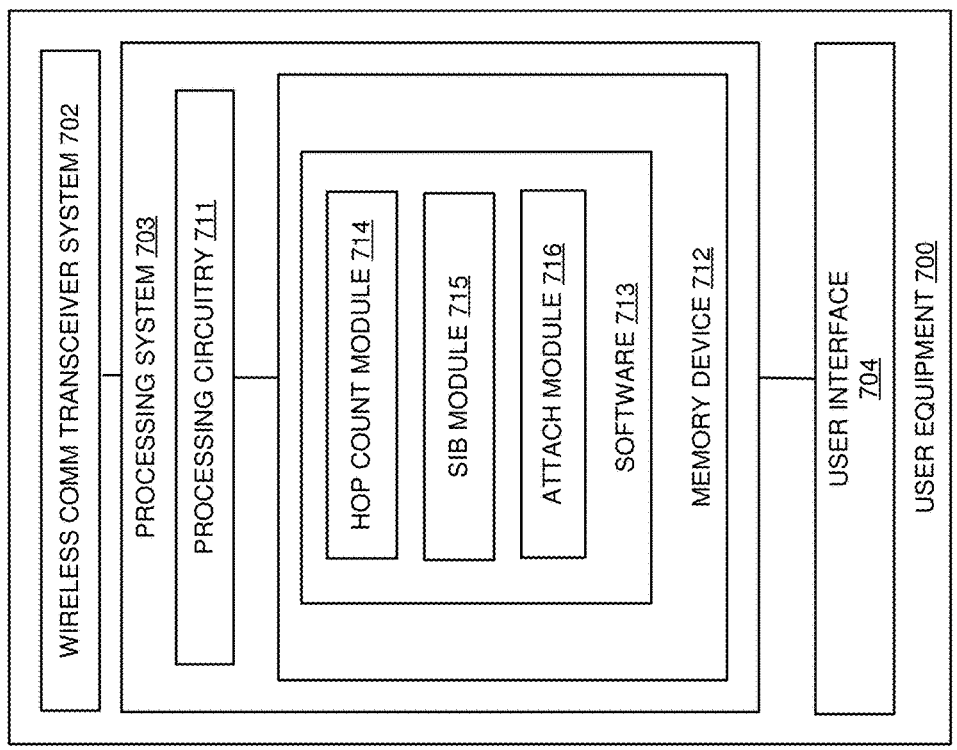
FIG. 7 illustrates an example of a UE.

FIG. 7 illustrates User Equipment (UE) 700. UE 700 is an example of UEs 101-103 and UEs 501-503, although UEs 101-103 and UEs 501-503 could use alternative configurations. UE 700 comprises wireless communication transceiver system 702, processing system 703, and user interface 704. Processing system 703 is linked to wireless communication transceiver system 702 and user interface 704. Processing system 703 includes processing circuitry 711 and memory device 712 that stores operating software 713. UE 700 may include other well-known components such as a battery and enclosure that are not shown for clarity. UE 700 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 702 comprises RF communication circuitry and an antenna. The RF communication circuitry typically includes an amplifier, filter, RF modulator, and signal processing circuitry. Wireless communication transceiver system 702 may also include a memory device, software, processing circuitry, or some other communication device. Wireless communication transceiver system 702 may use various communication formats, such as LTE, CDMA, EVDO, WIMAX, GSM, WIFI, HSPA, or some other wireless communication format—including combinations thereof.

User interface 704 comprises components that interact with a user to receive user inputs and to present media and/or information. User interface 704 may include a speaker, microphone, buttons, lights, display screen, touch screen, touch pad, scroll wheel, communication port, or some other user input/output apparatus—including combinations thereof. User interface 704 may be omitted in some examples.

Processing circuitry 711 comprises microprocessor and other circuitry that retrieves and executes operating software 807 from memory device 712. Memory device 712 comprises a non-transitory storage medium, such as a disk drive, flash drive, data storage circuitry, or some other memory apparatus. Processing circuitry 711 is typically mounted on a circuit board that may also hold memory device 712, portions of wireless communication transceiver system 702, and user interface 704. Software 713 comprises computer programs, firmware, or some other form of machine-readable processing instructions. Software 713 may include an operating system, utilities, drivers, network interfaces, applications, or some other type of software. When executed by processing circuitry 711, software 713 directs processing system 703 to operate user equipment 700 as described herein.

When executed, software 713 directs processing system 703 to operate as described herein to use hop count data and other network data to select a wireless relay. In particular, hop count module 714 directs processing system 703 to scan for hop count data in relay LTE SIBs. SIB module 715 directs processing system 703 to scan for network data in relay LTE SIBs. Attach module 716 directs processing system 703 to attach to the selected wireless relay. The wireless relay may be selected based on the requested service (i.e. VoLTE) in addition to hop count data. In other examples, the UE may select the wireless relay based on the number of users (i.e. load) or location (i.e. closest wireless relay or strongest RF signal) in addition to hop count.

Referring back to FIG. 1, UEs 101-103 comprise Radio Frequency (RF) communication circuitry and an antenna. The RF communication circuitry typically includes an amplifier, filter, modulator, and signal processing circuitry. UEs 101-103 may also include a user interface, memory device, software, processing circuitry, or some other communication components. UEs 101-103 may be a telephone, computer, e-book, mobile Internet appliance, wireless network interface card, media player, game console, or some other wireless communication apparatus—including combinations thereof.

Wireless relays 121-123, 131-132, and 141 comprise RF communication circuitry and an antenna. The RF communication circuitry typically includes an amplifier, filter, RF modulator, and signal processing circuitry. Wireless relays 121-123, 131-132, and 141 may also comprise a router, server, memory device, software, processing circuitry, cabling, power supply, network communication interface, structural support, or some other communication apparatus. Wireless relays 121-123, 131-132, and 141 could be a femto-cell base station, pico-cell base station, WIFI hotspot, or some other wireless access point—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network that comprises a macro base station and wireless relays, the method comprising:

the macro base station wirelessly broadcasting macro Long Term Evolution (LTE) System Information Blocks (SIBs) that indicate a wireless relay network identifier and a Voice over LTE (VoLTE) network identifier;

the wireless relays individually broadcasting relay LTE SIBs that indicate individual relay hop counts, the relay network identifier, and the VoLTE network identifier;

a first User Equipment (UE) attaching to the wireless relays to receive VoLTE service responsive to the wireless broadcast of the relay hop counts and the VoLTE network identifier from the wireless relays; and a second UE attaching to the macro base station for the VoLTE service responsive to the wireless broadcast of the relay hop counts from the wireless relays and the wireless broadcast the VoLTE network identifier from the macro base station.

2. The method of claim 1 wherein the relay LTE SIBs further include Radio Frequency (RF) data.

3. The method of claim 1 wherein the relay LTE SIBs further include a Carrier Aggregation (CA) service name.

4. The method of claim 1 wherein the relay LTE SIBs include a media service name.

5. The method of claim 1 wherein the relay LTE SIBs includes a Beam Forming (BF) service name.

6. The method of claim 1 wherein the relay LTE SIBs include a gaming service name.

7. The method of claim 1 wherein the relay LTE SIBs includes a video calling service name.

8. The method of claim 1 wherein the relay LTE SIBs includes a Video over LTE (ViLTE) indicator.

9. The method of claim 1, wherein the first UE attaching to the wireless relays comprises a source one of the wireless relays selecting a handoff target one of the wireless relays based on the individual hop count for the target one of the wireless relays.

10. A data communication network comprising wireless relays having hop counts, the data communication network comprising:
 a macro base station configured to wirelessly broadcast macro Long Term Evolution (LTE) System Information Blocks (SIBs) that indicate a wireless relay network identifier and a Voice over LTE (VoLTE) network identifier;
 the wireless relays configured to individually broadcast relay LTE SIBs that indicate individual relay hop counts, the relay network identifier, and the VoLTE network identifier;
 a first User Equipment (UE) configured to attach to the wireless relays to receive VoLTE service responsive to the wireless broadcast of the relay hop counts and the VoLTE network identifier from the wireless relays; and
 a second UE configured to attach to the macro base station for the VoLTE service responsive to the wireless broadcast of the relay hop counts from the wireless relays and the wireless broadcast the VoLTE network identifier from the macro base station.

11. The data communication network of claim 10 further comprising:
 the wireless relays configured to wirelessly broadcast the relay LTE SIBs indicating Radio Frequency (RF) data.

12. The data communication network of claim 10 further comprising:
 the wireless relays configured to wirelessly broadcast the relay LTE SIBs indicating a Carrier Aggregation (CA) service name.

13. The data communication network of claim 10 further comprising:
 the wireless relays configured to wirelessly broadcast the relay LTE SIBs indicating a media service name.

14. The data communication network of claim 10 further comprising:
 the plurality of wireless relays configured to wirelessly broadcast the relay LTE SIBs indicating a Beam Forming (BF) service name.

15. The data communication network of claim 10 further comprising:
 the wireless relays configured to wirelessly broadcast the relay LTE SIBs indicating a gaming service name.

16. The data communication network of claim 10 further comprising:
 the wireless relays configured to wirelessly broadcast the relay LTE SIBs indicating a video calling service name.

17. The data communication network of claim 10 further comprising:
 the wireless relays configured to wirelessly broadcast the relay LTE SIBs indicating a Video over LTE (ViLTE) indicator.

18. The data communication network of claim 10 further comprising a source one of the wireless relays configured to select a handoff target one of the wireless relays for the first UE based on the individual hop count for the handoff target one of the wireless relays.

* * * * *